United States Patent [19]
Penberthy

[11] 3,873,292
[45] Mar. 25, 1975

[54] GLASS CASTING APPARATUS AND METHOD

[76] Inventor: Harvey Larry Penberthy, 5624 Admiral Way, S.W., Seattle, Wash. 98116

[22] Filed: Mar. 18, 1974

[21] Appl. No.: 452,107

[52] U.S. Cl. .......................... 65/68, 65/23, 65/355, 65/356, 65/323, 64/122, 249/61, 249/65, 264/316, 264/317, 264/327
[51] Int. Cl. ....... C03c 19/00, C03b 9/14, C03b 9/38
[58] Field of Search ........... 65/72, 223, 356, 93, 23, 65/66, 68, 323, 221, 355; 264/317, 327, 316; 164/122; 425/243, 251, DIG. 12; 249/61, 65

[56] References Cited
UNITED STATES PATENTS

| | | | |
|---|---|---|---|
| 788,144 | 4/1905 | Pease | 65/356 X |
| 1,884,926 | 10/1932 | Van Ness | 65/23 |
| 2,045,716 | 6/1936 | McCauley | 65/93 X |
| 2,490,528 | 12/1949 | Lemmens | 65/23 |
| 2,887,759 | 5/1959 | Brownell, Jr. | 264/316 X |
| 3,233,994 | 2/1966 | Penberthy | 65/66 |
| 3,520,668 | 7/1970 | Keefer | 65/23 |
| 3,598,357 | 8/1971 | McLean | 249/65 |
| 3,725,023 | 4/1973 | Parris | 65/72 |

*Primary Examiner*—S. Leon Bashore
*Assistant Examiner*—F. W. Miga
*Attorney, Agent, or Firm*—Richard S. Sciascia; Ervin F. Johnston

[57] ABSTRACT

A glass casting apparatus which includes an outside mold and an inside mold. The molds are generally hollow spheres and are spaced from one another so as to form a generally spherical shell cavity. The molds are adapted to receive molten glass within the cavity, and means are provided for introducing a granulated solid, such as sand, into the inside mold. The method includes simultaneously progressively filling the cavity with molten glass and the interior mold with sand at a rate to counteract the buoyancy of the inside mold as acted on by the molten glass.

12 Claims, 3 Drawing Figures

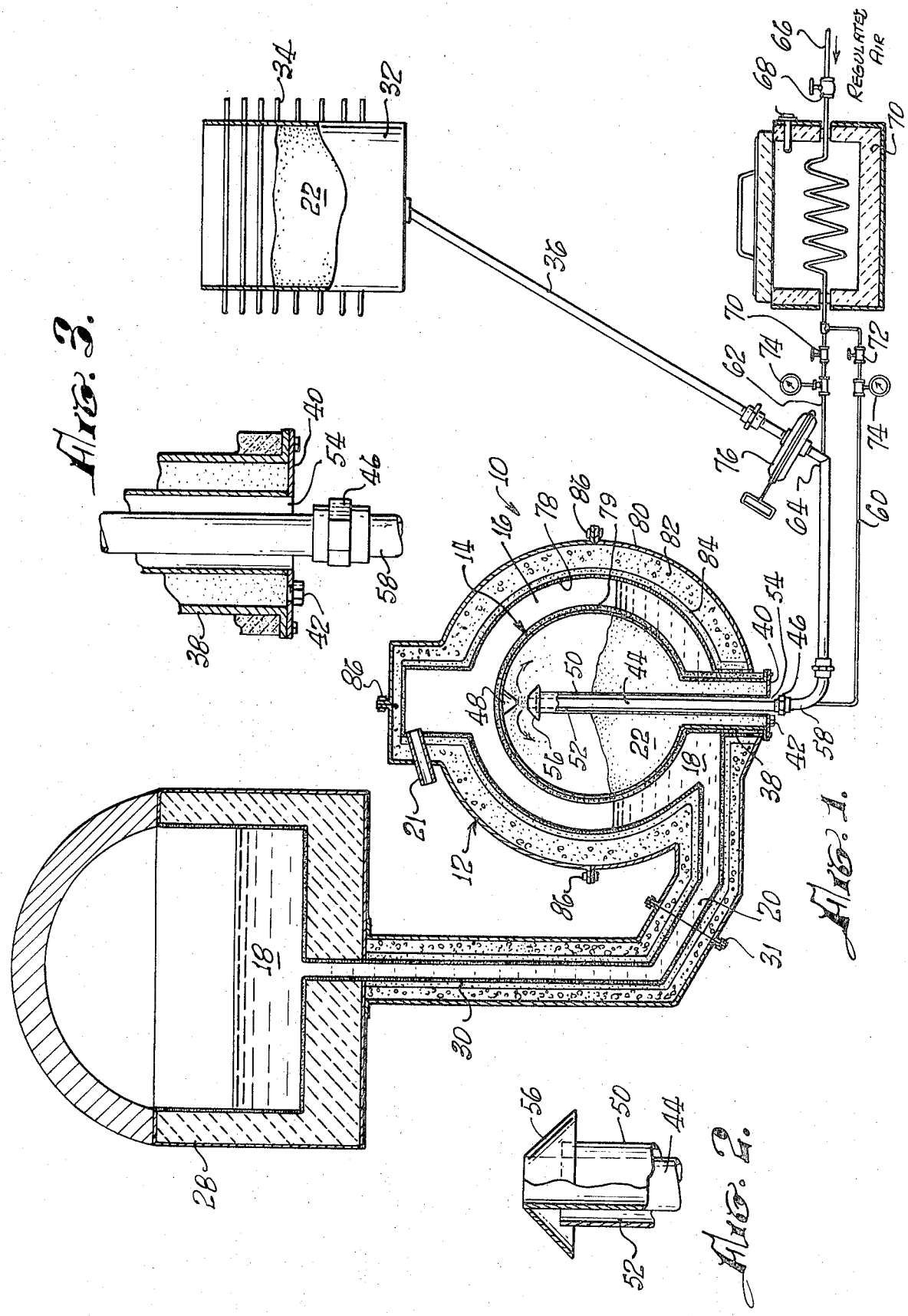

3,873,292

GLASS CASTING APPARATUS AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The U.S. Navy has been expending a considerable amount of effort in research and development structural underwater submersibles which are manned by one or more aquanauts. These submersibles, some of which are powered, are utilized for salvage work and obtaining data concerning the characteristics of the ocean. It is generally known that hollow glass spheres provide an extremely stong strucural body which enables visual observations at deep ocean depths. The glass sphere actually increases in strength as it descends in the ocean.

The construction of a hollow glass sphere which is large enough to be manned and carry necessary support equipment is not an easy task. These hollow spheres are spherical except for an entrance and exit port. It is extremely important that the hollow body have a true spherical shape, and that it be free of cracks which may come during the cooling process. In order to obtain the desired shape and prevent cracks it is extremely important to uniformly cool the inside of the glass surface under controlled conditions.

Another problem associated with the construction of large hollow glass spheres is the high buoyancy and crushing forces exerted on the interior mold of the casting apparatus. Ordinarily, an interior mold is constructed of heavy bulky material which is heavily secured to the remainder of the apparatus so as to maintain the structural integrity of the apparatus during the exertion of these large crushing and buoyancy forces.

STATEMENT OF THE INVENTION

The present invention overcomes the aforementioned problems by providing a unique glass casting apparatus and method for constructing large, hollow glass spheres with a controlled uniform cooling of the inside surface of the sphere. Because of the invention a very thin and minimum strength interior mold can be utilized which will maintain its structural integrity along with the remainder of the apparatus during the construction of the hollow glass sphere. This has been accomplished by providing a pair of hollow generally spherical molds which form the sperical shell cavity. The molds are adapted to receive molten glass within the cavity, and means are connected to the inside mold for introducing a granulated solid, such as sand, into the inside mold. The method of the invention includes progressively filling the cavity with molten glass and simultaneously progressively filling the interior of the mold with hot sand at a rate which counteracts the buoyancy of the molten glass on the inside mold. The sand, which may or may not be the same density as the molten glass, counteracts the crushing and buoyancy forces exerted by the molten glass on the outside of the interior mold and uniformly cools the inside of the glass so as to prevent any cracking.

STATEMENT OF THE OBJECTS OF THE INVENTION

An object of the present invention is to overcome the aforementioned problems associated with the construction of large hollow glass spheres.

Another object is to provide a glass casting apparatus for casting large hollow glass spheres which will enable the interior of the glass to be uniformly cooled.

A further object is to provide a glass casting apparatus for casting large hollow glass spheres wherein the interior mold of the apparatus is constructed of minimum size and strength and will yet enable uniform cooling of the inside surface of the glass.

Still another object is to provide a method of constructing large hollow glass spheres with uniform cooling of the inside glass surface through an interior mold of relatively lightweight construction.

These and other objects of the invention will become more readily apparent from the drawing when taken with the ensuing specification.

DESCRIPTION OF THE DRAWING

FIG. 1 is a schematic illustration of the present invention, shown mostly in cross section to illustrate various elements thereof.

FIG. 2 is an enlarged portion of the top portions of the pipes within the interior mold of the apparatus in FIG. 1.

FIG. 3 is an enlarged portion of the bottom portion of the molds.

DESCRIPTION OF THE PREFERRED EMBODIMENT

Referring now to the drawing wherein like reference numerals designate like or similar parts throughout the several views there is illustrated in FIG. 1 an exemplary glass casting apparatus 10 which includes an outside mold 12 and an inside mold 14. The molds 12 and 14 may be generally hollow spheres which are spaced from one another so as to form a generally spherical shell cavity 16. The molds 12 and 14 are adapted to receive molten glass 18 within the cavity 16. This may be accomplished by providing an entrance port 20 at a bottom portion of the exterior mold 12. Venting of the cavity 16 during its filling with molten glass 18 may be accomplished by a vent pipe 21 which extends through the exterior mold 12 into a top portion of the cavity.

Means, which will be described in full detail hereinafter, are connected to the inside of the mold 14 for introducing a granulated solid, such as sand 22, into the inside mold. As illustrated in FIG. 1, the molten glass 18 may be melted and stored in a tank furnace 28 which is connected to the cavity 16 by a well insulated heater pipe 30. The pipe 30 may have a joint 31 for connection to the molds 12 and 14. The sand 22 may be stored in a hopper 32 which is heated by heating elements 34 and which is connected to the interior of the interior mold 14 by a feeder pipe 36.

As mentioned hereinabove, it is desirable that the hollow glass sphere be provided with a top opening which will serve as a hatch for the entrance and exit of personnel as well as equipment. This has been provided for in the casting apparatus by utilizing a flask shaped interior mold 14. The neck 38 of this interior flask shaped mold extends downwardly through the bottom of the exterior mold 12 so as to form the port opening in the completed hollow glass sphere. A base plate 40 may be mounted across the bottom opening of the neck 38 and bolted to an annular flange thereon so as to form a bottom for the interior mold 14. A plug 42 may be threaded in the bottom base plate 40 for removing the sand from the interior of the interior mold 14 after the hollow glass sphere has been cooled within the cavity 16.

There was a statement hereinabove to means which are connected to the inside mold 14 for introducing the sand therein. It is this means that enables uniform cooling of the inside surface of the molded glass sphere as well as enabling structural integrity of a relatively lightweight interior mold 14 during the filling of the cavity 16 with molten glass 18. This sand introducing means may include a substantially vertical standpipe 44 which is mounted upwardly within the interior of the interior mold 14. The bottom of the standpipe 44 may extend downwardly through the bottom base plate 40 and may be connected to the sand feeder pipe 36 by any suitable coupling 44. The standpipe 44 extends upwardly beyond the interior center of the interior mold 14 in close proximity to the top interior thereof. In this manner, the sand 22 can exit the top of standpipe 44 and fall circumferentially therearound to substantially completely fill the interior of the interior mold 14 as molten glass fills the cavity 16. The circumferential dissemination of the sand above the standpipe 44 may be enhanced by providing a cone-shaped deflector 48 which is mounted to the interior top of the interior mold 14 directly above the top of the standpipe 44.

In order to vent the interior of the interior mold 14 while sand is being introduced therein an outer pipe 50 may be concentrically mounted about the standpipe 44 so as to form an annular space 52 therebetween. The outer pipe 50 extends to the bottom base plate 40. The base plate 40 may be provided with a series of apertures or an annular opening 54 which opens into the annular space 52 so that air within the interior mold 14 may be vented into the atmosphere outside the casting apparatus.

In order to prevent sand from entering the pipe 50 while air is being vented therethrough an umbrella flange 56 may be mounted to the top of the standpipe 44. The umbrella flange 56 has an exterior diameter which is greater than the exterior diameter of the outer pipe 50. The outer pipe 50 extends upwardly within the umbrella flange 56 and stops short of the top of the standpipe 44 so that vented air can enter the space 52 between the pipes without any introduction of sand.

In order to force the sand upwardly in the standpipe 44 and into the interior mold 14 the feeder pipe 36 may be provided with a curve 58. A high pressure gas line 60 may be connected to the feeder line 36 at the curve 58 so as to be directed downstream for forcing the sand upwardly within the standpipe 44. Another high pressure gas line 62 may be connected to the feeder pipe 36 at another curve location 64. The air lines 60 and 62 may be connected to a high pressure source (not shown) by a source line 66 which may be controlled in its pressure by a valve 68. This gas source line 66 may extend through a heater 70 for heating the gas prior to introduction into the feeder line 36. In addition to the valve 68, valves 70 and 72 may be utilized for controlling the rate of flow of the sand within the feeder pipe 36. Pressure indicators 74 in the lines 60 and 62 will provide indications of this controlled operation. In addition, a valve 76 may be provided in the feeder line 36 for controlling gravity flow of the sand within the hopper 32.

In order to provide for an easy parting of the molds from the finished hollow glass sphere the exterior of the interior mold 14 and the interior of the exterior mold 12 may be provided with thin ceramic liners 78 and 79. The liners 78 and 79 may be constructed with ceramic cloth which are cemented in layers using a high temperature ceramic cement. The interior mold 14 may be constructed of stainless steel which is roughened on its exterior so that the ceramic cloth will appropriately adhere thereto. Stainless steel type 309 has been found to be satisfactory for the construction of the interior mold 14.

The exterior mold 12 may be constructed of an outer mild steel shell 80 which has ceramic layers 82 and 84 between the steel shell and the liner 78. The ceramic layers 82 and 84 may be constructed of fused-silica powder which is cast and baked to the appropriate shape. The outer steel shell 80 may be constructed in segments with flanges 86 so that the ceramic portions of the mold 12 can be easily broken away for the removal of the hollow glass sphere after cooling.

It is desirable that the sand 22, which is introduced into the interior of the interior shell 14, be substantially the same density in bulk volume as the molten glass 18. Substantially the same density is obtained by using borosilicate glass for the molten glass 18 and zircon sand for the sand 22. The density for the boro-silicate glass is about 2.4 and the bulk density of the zircon sand is approximately the same. The molten glass is introduced into the cavity 16 at a temperature of about 2,000° F. In order to provide for proper cooling of the interior surface of this glass, the sand 22 may be preheated within the hopper 32 to a temperature of about 600°F. As the molten glass and sand simultaneously fill within the appropriate spaces they will come to an equilibrium temperature of about 1200°F.

In the operation of the apparatus 10, an appropriate volume of glass is placed into the tank furnace 28 and brought to a finished molten state of approximately 2000°F. The appropriate amount of sand 22 is placed within the hopper 32 and heated by the elements 34 to approximately 600°F. Molten glass is then introduced into the cavity 16 and valves 76, 70, 72, and 66 are opened to introduce sand through the standpipe 44 into the interior of the interior mold 14. The level of the sand 22 in the interior of the mold 14 is maintained at a level to counteract totally or partially the buoyancy forces on the inside mold 14 due to the rising molten glass. The buoyancy force would not have to be totally counteracted by the weight of the sand since the inside mold 14 has its own weight and is anchored in its location. Heating elements in the conduit 30 and the tank 28 heat the glass to start the glass flowing through conduit 30. A portion of the molten glass may be dumped before the molds are connected to the conduit 30 at joint 31. The levels of molten glass and sand may be maintained by carefully watching the level of the molten glass 18 and the level of the sand 22 in the respective hoppers. Port holes (not shown) may be provided for visually inspecting the hopper levels. When the molten glass 18 has reached the top of the spherical portion of the exterior mold 12, the casting is complete and the glass is allowed to cool. During the filling process the sand 22 provides structural integrity to the interior mold 14 and uniformly cools the interior surface of the glass casting to reduce any tendency to cracking during the cooling process. After the glass has cooled appropriately the steel segments of the exterior mold 12 are removed at flanges 86 and the ceramic portions 82 and 84 are broken away so that the mold 14 and the hollow spherical glass shell can be removed. The mold 14 is then dissolved with acid to leave the completed glass shell.

While the invention illustrated in FIG. 1 shows the sand being introduced into the inside mold 14 from the bottom thereof it should be understood that with a somewhat different arrangement the sand could be introduced into the inside mold from a top location. To accomplish this the inside mold 14 would be located with its neck 38 and opening in an upward position or 180° from its location in FIG. 1. The neck 38 would be open and the pipes 44, 50 and 36 would not be required. Hot sand would simply be dropped into the inside mold 14 and after completion may be vacuumed out.

The method of constructing the large, glass hollow spheres may comprise first the step of providing the pair of hollow generally spherical molds 12 and 14 which form the generally spherical shell cavity 16. Next, molten glass is introduced to progressively fill the cavity 16. Simultaneously, hot sand is progressively introduced to fill the interior of the interior mold 14 to counteract buoyancy forces by the molten glass on the inside mold 14. The method further includes the step of introducing the sand at the bottom of the interior mold 14 and disseminating the sand from a top interior portion thereof. The air within the interior mold during this filling process may be vented through the bottom of the interior mold. The sand may be forced into the interior portion of the interior mold 14 by pressurized hot gas through the pipes 60 and 62. Venting of the air within the exterior mold 12 may be accomplished by venting this air through a top portion, such as through vent pipe 24. Further, in the method it is desirable to provide glass 18 and sand 22 which is of substantially the same density in bulk volume.

Obviously, many modifications and variations of the present invention are possible in the light of the above teachings, and, it is therefore understood that within the scope of the disclosed inventive concept, the invention may be practiced otherwise than specifically described.

What is claimed is:
1. A glass casting apparatus comprising:
an outside mold and an inside mold;
said molds being generally hollow spheres and being spaced from one another so as to form a generally spherical shell cavity;
means for supplying molten glass within said cavity;
a substantially vertical standpipe means mounted within the inside mold;
the top of the standpipe being located in the top half portion of the inside mold and spaced a short distance down from the top interior of the inside mold; and
means for supplying a granulated solid to the vertical standpipe;
whereby upon simultaneous introduction of the molten glass and granulated solid into the glass casting apparatus the granulated solid will fall down about the standpipe to counteract buoyancy forces of the molten glass on the exterior of the inside mold.

2. An apparatus as claimed in claim 1 including:
an outer pipe concentrically mounted about the standpipe so as to form an annular space therebetween;
the standpipe and outer pipe extending to the bottom of the inside mold;
the bottom of the inside mold opening into the annular space between the standpipe and the outer pipe;
whereby the inside mold is vented to the atmosphere about the apparatus as the inside mold is filled with granulated solid.

3. An apparatus as claimed in Claim 2 including:
the inside mold having the shape of a flask with the neck extending through the bottom of the outside mold;
a base plate mounted across the opening of the neck so as to form said bottom of the inside mold; and
a plug removably mounted in the bottom base plate for removing the granulated solid after the molding process has been completed.

4. An apparatus as claimed in claim 2 including:
a cone shaped deflector mounted to interior top of the inside mold directly above the top of the standpipe for deflecting the granulated solid circumferentially about the standpipe;
an umbrella shaped flange mounted to the top of the standpipe, said flange having an exterior diameter which is greater than exterior diameter of the outer pipe; and
the outer pipe extending within the umbrella flange and stopping short of the top of the standpipe.

5. An apparatus as claimed in claim 1 including:
a feeder pipe connected to the bottom of the standpipe, said feeder pipe having a curve therealong; and
a high pressure gas line connected to the feeder pipe at the curve and directed downstream for forcing the granulated solid into the inside mold.

6. An apparatus as claimed in claim 5 including:
a hopper for holding the granulated solid;
said feeder pipe being connected to the hopper; and
said granulated solid being a sand and said sand being disposed within the hopper; and
means mounted to the hopper for heating the sand.

7. An apparatus as claimed in claim 5 including:
the inside mold having the shape of a flask with the neck extending through the bottom of the outside mold;
a base plate mounted across the opening of the neck so as to form said bottom of the inside mold; and
a plug removably mounted in the bottom base plate for removing the granulated solid after the molding process;
an outer pipe concentrically mounted about the standpipe so as to form an annular space therebetween;
the standpipe and outer pipe extending to the bottom of the inside mold;
the bottom of the inside mold opening into the annular space between the standpipe and the outer pipe;
a cone shaped deflector mounted to interior top of the inside mold directly above the top of the standpipe for deflecting the granulated solid circumferentially about the standpipe;

an umbrella shaped flange mounted to the top of the standpipe, said flange having an exterior diameter which is greater than exterior diameter of the outer pipe; and the outer pipe extending within the umbrella flange and stopping short of the top of the standpipe.

8. A method of constructing large glass hollow spheres comprising the steps of:

providing a pair of hollow generally spherical molds which form a generally spherical shell cavity;

progressively filling the cavity with molten glass; and progressively filling the interior of the inside mold with hot ballast simultaneously with the filling of the cavity with molten glass to counteract buoyancy forces of the molten glass on the exterior of the inside mold.

9. A method as claimed in claim 8 including the steps of:

introducing the ballast at the bottom of the inside mold and disseminating the ballast from the top interior portion of the inside mold; and venting the inside mold from the bottom.

10. A method as claimed in claim 9 including the steps of:

providing sand for said ballast; and forcing the sand into the inside mold with pressurized hot gas.

11. A method as claimed in claim 10 including the step of:

venting the cavity through a top portion of the outside mold.

12. A method as claimed in claim 11 including the step of:

providing glass and sand of substantially the same density in bulk volume.

* * * * *